United States Patent [19]

Fairbanks

[11] Patent Number: 4,597,646

[45] Date of Patent: Jul. 1, 1986

[54] APPARATUS FOR POSITIONING A STYLUS

[75] Inventor: David W. Fairbanks, Middlesex County, N.J.

[73] Assignee: RCA Corporation, Princeton, N.J.

[21] Appl. No.: 556,934

[22] Filed: Dec. 1, 1983

[51] Int. Cl.[4] ............................................. G02B 21/26
[52] U.S. Cl. ................................................... 350/529
[58] Field of Search ........................ 350/529, 530, 531

[56] References Cited

U.S. PATENT DOCUMENTS

| | | | |
|---|---|---|---|
| 3,600,057 | 8/1971 | Leffler | 350/529 |
| 3,842,194 | 10/1974 | Clemens | 178/6.6 A |
| 4,030,124 | 6/1977 | Alien | 358/128 |
| 4,341,437 | 7/1982 | Van Raalte et al. | 350/81 |
| 4,341,472 | 7/1982 | Gorog et al. | 356/399 |

Primary Examiner—John K. Corbin
Assistant Examiner—Vincent J. Lemmo
Attorney, Agent, or Firm—Birgit E. Morris; Donald S. Cohen; James M. Trygg

[57] ABSTRACT

An apparatus for consistently and automatically positioning the point of a stylus within the field of view and at the focal point of a high power microscope while the stylus remains in the stylus cartridge. All positioning is effected through physical contact between the stylus and the apparatus without contact of the fragile stylus point occurring.

8 Claims, 7 Drawing Figures

APPARATUS FOR POSITIONING A STYLUS

This invention relates to the positioning of a stylus in a three dimensional coordinate system and more particularly to the positioning of the point of a stylus within the field of view and at the focal point of a high power microscope.

BACKGROUND OF THE INVENTION

Audio and video disc playback systems of the type using a disc having recorded information signal encoded into a fine spiral groove typically utilize a stylus to read the encoded information signals. Included in such systems are the capacitive playback systems, wherein the stylus dielectric material is coated on at least one surface with a conductive metal layer which interacts with the conductive disc to read the information encoded thereon. An example of such a system is disclosed in U.S. Pat. No. 3,842,194 issued Oct. 15, 1974 to Clemens. Clemens discloses a video disc having a playback system utilizing variable capacitance. In one configuration of the Clemen's system information representative of recorded picture and sound is encoded in the form of a relief pattern in a relatively fine spiral groove on the surface of a disc record. For example, groove widths of about 3.5 micrometers and groove depths of about 1.0 micrometer may be used. During playback a pickup stylus about 2.0 micrometers wide having a thin conductive electrode thereon, for example about 0.2 micrometer thick, engages the groove as the record is rotated by a supportive turntable. Capacitive variations between the stylus electrode and the disc record surface are sensed to recover the pre-recorded information. In systems of the above type, the use of a relatively fine record groove and the requirements for a groove engaging pickup stylus result in a stylus tip which is extremely small.

During the manufacturing of such styli frequent inspection of the tip is necessary. This inspection is usually done by examination through a high power optical microscope having, for example 1000× to 1500× magnification. At such high magnification the field of view of the microscope is relatively small making the task of positioning the stylus tip tedious. Precision tooling used to hold and position the stylus during the manufacturing process generally provide banking surfaces that establish a datum and aid in the accurate positioning of the tip for inspection purposes. However, once the stylus is assembled into the stylus holder and into the cartridge such banking surfaces are no longer available.

In order to examine the stylus tip with a microscope once the stylus is in the cartridge, the tip must be aligned by reference to the stylus only. One system for doing this is disclosed in U.S. Pat. No. 4,341,472 issued July 27, 1982 to Goroy et al. There, a pair of linear arrays of photodetectors are arranged to receive projected optical images of the stylus point from both the x and y axes. Output signals from the linear arrays indicate when the stylus point is in a desired location.

Systems such as that disclosed by Goroy et al. are relatively complex and costly. The present invention, on the other hand, provides a novel mechanical apparatus for rapidly and automatically positioning a stylus tip within the field of view of a microscope without physical contact between the stylus tip and the apparatus.

SUMMARY OF THE INVENTION

According to the present invention there is shown an apparatus for positioning a portion of a body within the field of view and at the focal point of an optical microscope wherein the body is carried by a holder. The apparatus comprises means for positioning the holder with respect to the microscope, and guide means for positioning the portion of the body with respect to the microscope upon engagement of the body with the guide means. An actuating means is provided for effecting the engagement of the body with the guide means.

DESCRIPTION OF THE PREFERRED EMBODIMENT

Figure 1:
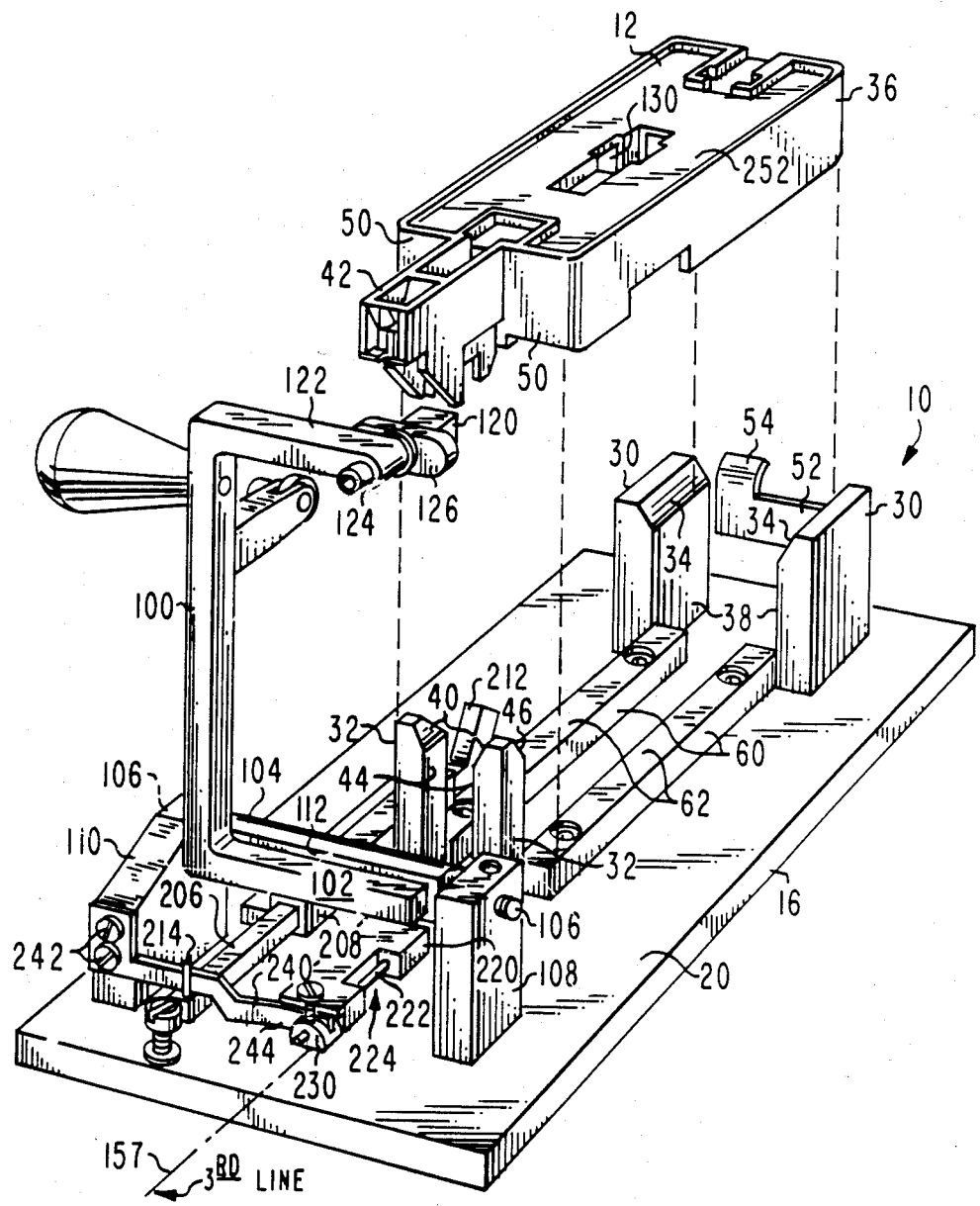
FIG. 1 is an isometric view of a positioning apparatus having the teachings of the present invention incorporated therein.
Figure 2:
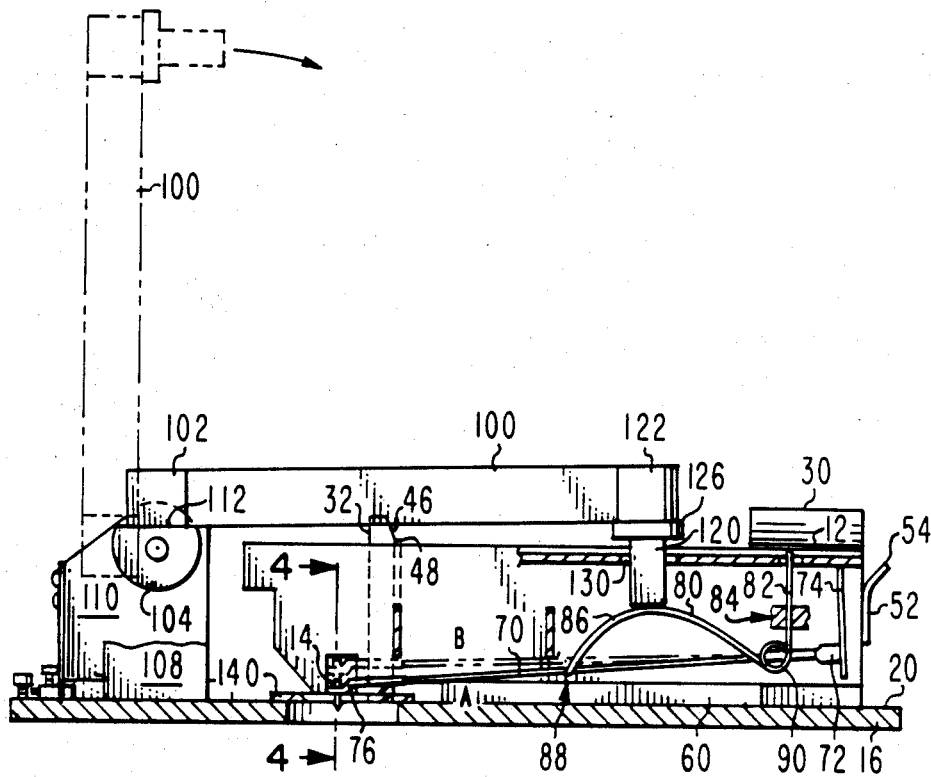
FIG. 2 is a sectional view of the apparatus showing a stylus cartridge and stylus positioned along two coordinate axes.
Figure 3:
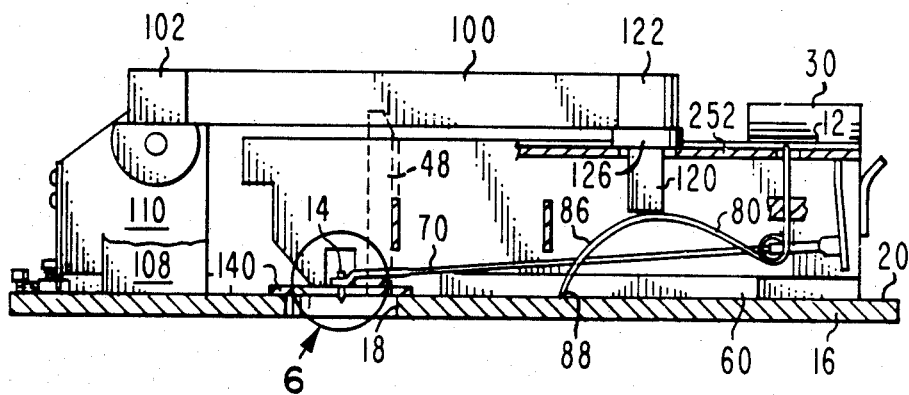
FIG. 3 is a view similar to that of FIG. 2. wherein the stylus is positioned along three coordinate axes.

With reference to FIGS. 1, 2, and 3, there is shown an apparatus 10 for holding a stylus cartridge 12 and positioning the stylus 14 contained therein. The cartridge 12 will be briefly described below, however, the reader is referred to U.S. Pat. No. 4,030,124 which issued June 14, 1977 to Allen for a more detailed description of the cartridge. The cartride 12, as best seen in FIGS. 1,2 and 3, is generally elongated having an end 36 and an end 42. The end 42 is necked down thereby forming two coplanar surfaces 50 which are used to position the cartridge along its longitudinal axis. A web 252 is formed integral to the cartridge 12 providing strength and rigidity thereto. An opening 130 is formed in the web 252 for a purpose that will be described in detail below. The cartridge 12, contains a stylus holder 70 for holding the stylus 14. The stylus holder 70, having one end 72 attached to a resilient member 74, is arranged longitudinally with respect to the cartridge, the other end 76 being unsupported. The resilient member 74 biases the stylus holder 70 into the position shown in solid lines at A in FIG. 2. A retaining spring 80 has one end 82 anchored in the structure of the cartridge 12 at 84. The other end 86 of the retaining spring 80 curves under and around the stylus holder 70 at 88 and loosely constrains the holder 70. A resilient coil 90 is formed in the spring 80 to bias the end 86 upwardly as viewed in FIGS. 2 and 3. This upward bias of the retaining spring 80 urges the stylus 14 and the stylus holder 70 into the position shown in phantom lines at B in FIG. 2.

The apparatus 10 includes a flat base plate 16 having a mounting surface 20. Two pairs of guide blocks 30 and 32 are attached to the surface 20 with suitable screw fasteners and positioned as shown in FIG. 1. The guide blocks 30 are arranged with inwardly facing bevels 34 to guide one end 36 of the cartridge 12 into snug positioning contact with the inside walls 38 of the guide blocks 30. The guide blocks 32 are arranged with inwardly facing bevels 40, similar to the bevels 34, to guide the other end 42 of the cartridge 12 into snug positioning contact with the inside walls 44 of the guide blocks 32. Another pair of bevels 46 are formed in the guide blocks 32, facing in the general direction of the pair of guide blocks 30, and terminate in a pair of walls 48, as shown in FIGS. 1 and 2. The walls 48 are arranged perpendicular to the surface 20 of the base plate 16 and provide a stop against which the pair of surfaces 50 are pressed by the leaf spring 52. The leaf spring 52 is attached to one of the guide blocks 30 by any suitable fastener, as shown in FIG. 1, and has an outwardly turned tab portion 54 to permit easy insertion of the cartridge 12 into the apparatus 10. Any suitable resilient member may be used in place of the leaf spring 52 to urge the cartridge 12 into abutting contact with the walls 48. A pair of parallel bars 60 are screwed to the mounting surface 20, as shown in FIG. 1. The parallel bars 60 have top surfaces 62 upon which the cartridge 12 rests.

A U shaped actuating arm 100 has one of its legs 102 rigidly attached to a shaft 104 which is pivotally supported between a pair of pintles 106 held in two pillow blocks 108 and 110. The shaft 104 has a flat 112 formed thereon to which a leg 102 of the arm 100 is attached. A stylus actuating member 120 is rigidly attached to an end of the arm 100 by a screw fastener 124. A stop clamp 126 is sandwiched between the arm 100 and the stylus actuating member 120, as shown in FIGS. 1,2, and 3, and is held in place by the fastener 124. The member 120 is positioned on the arm 100 so that as the arm 100 is pivoted into the position shown in solid lines in FIG. 2, the member 120 enters an opening 130 formed in the cartridge 12 and depresses the retaining spring 80 causing the stylus holder 70 to move from the position shown at B to that shown at A. The effect of this movement of the stylus holder 70 will be described in detail below.

Figure 4:
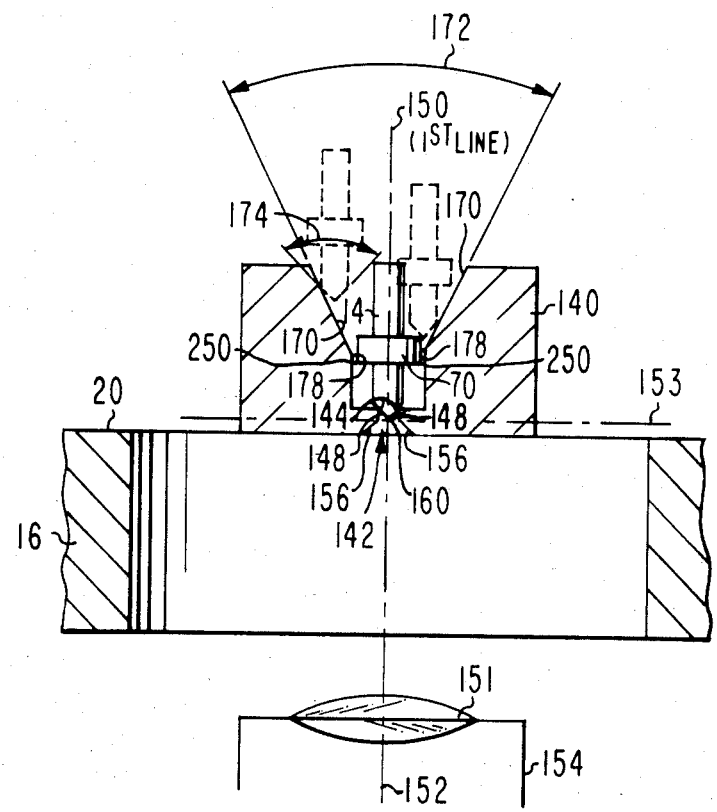
FIG. 4 is a sectional view taken along the lines 4—4 of FIG. 2.
Figure 7:
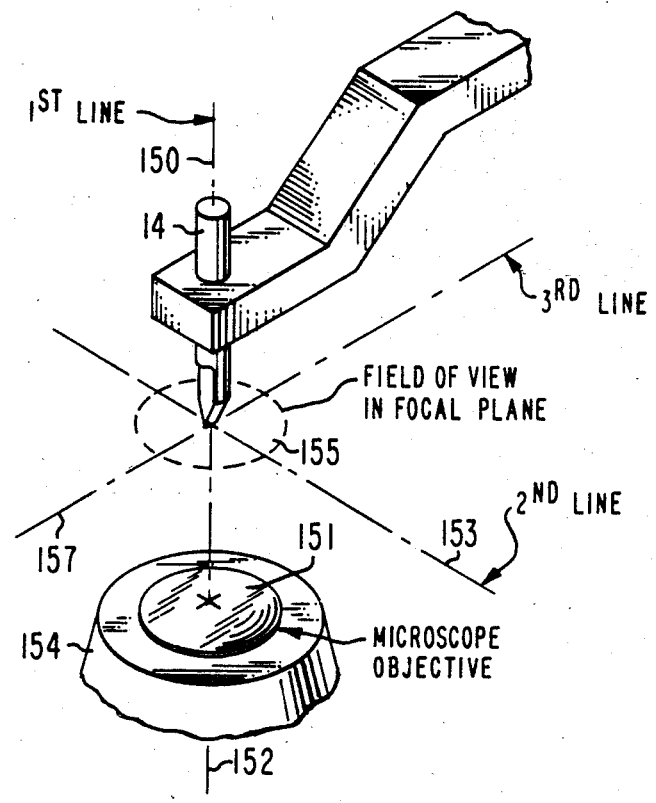
FIG. 7 is a schematic representation of a three dimensional coordinate system relating a stylus point to the objective lens of a microscope.

A locating block 140 is attached to the mounting surface 20 in the position shown in FIGS. 2,3, and 4. As best seen in FIG. 4 the locating block 140 has a narrow slit 142 formed therein having a width, about 6 mils, that is smaller than the width of the stylus 14. The two edges of the slit 142 form contact surfaces 144 which contact the bevelled surfaces 148 of the stylus 14. The slit 142 is positioned to straddle a first line 150 which is coincident with the optical axis 152 of an optical microscope 154. The contact surfaces 144 are mutually parallel and displaced vertically above the focal plane 155 of the microscope 154 a specific distance, as viewed in FIG. 4. This assures that when the bevelled surfaces 148 of the stylus 14 are in proper engagement with the contact surfaces 144, the point 160 of the stylus 14 is coincident with the focal plan 155 of the microscope 154. Additionally, the contact surfaces 144 are spaced above a second line 153 which lies in the focal plane 155 and is perpendicular to the first line 150. A hole 18 is formed through the base plate 16 directly under the slit 142 so that the stylus may be viewed therethrough. The slit 142 includes two chamfers 156 which permit illumination of the point 160 of the stylus 14 by a suitable light source, not shown. A pair of guide surfaces 170 are arranged on opposite sides of the slit 142 and are mutually inclined inwardly converging toward the slit 142 and a third line 157 that is orthogonal to the first and second lines 150 and 153. The interrelationship of the first, second, and third lines, 150, 153, 157 and the focal plane 155 to the stylus 14 is best seen in FIG. 7. The pair of guide surfaces 170 form an included angle 172 that is smaller than the included angle 174 of the stylus point 160 as shown in FIG. 4. The surfaces 170 terminate at their lower extremities in a pair of edges 178 that are spaced apart a sufficient distance to permit entry of the stylus holder therebetween, as shown in FIG. 4, with a small amount of clearance. The total amount of clearance is preferably smaller than the width of the narrow slit 142. Should the stylus 14 project below the holder 70 substantially further than as shown in FIG. 4, the holder 70 will remain above the edges 178. In this case the amount of clearance between the stylus 14 and the edges 178 is preferably smaller than the width of the narrow slit 142.

Figure 5:
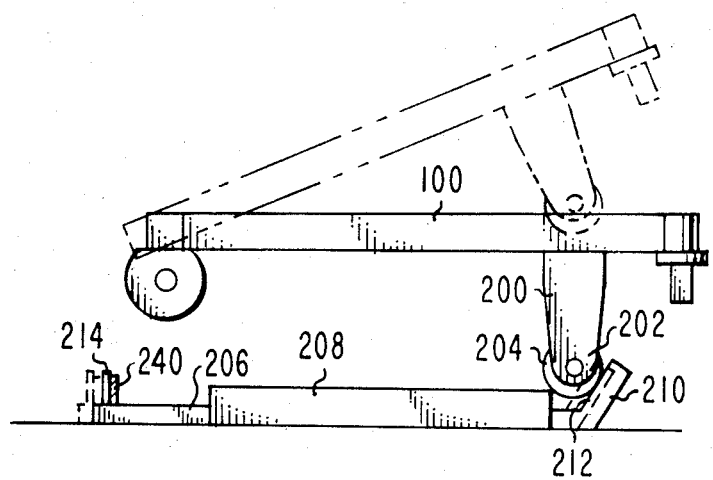
FIG. 5 is a partial front view of the apparatus shown in FIG. 1 showing a portion of the positioning mechanism.

The U shaped actuating arm 100 includes a downwardly projecting cam operating member 200, as viewed in FIG. 5, rigidly attached thereto with weld or suitable screw fasteners, not shown. The member 200 has journaled in its end 202, a roller 204. A slide member 206, of rectangular cross section is slidingly retained within a guide 208 which is attached to the mounting surface 20 as shown in FIG. 1. The guide 208 is arranged so that the slide member 206 may undergo longitudinal movement in a direction that is parallel to the third line 157. One end of the slide member 206 has an upwardly turned portion 210 having a camming surface 212 arranged to operationally engage the roller 204 as shown in FIG. 5. The other end of the slide member 206 has a vertically disposed pin 214 rigidly attached thereto.

Figure 6:
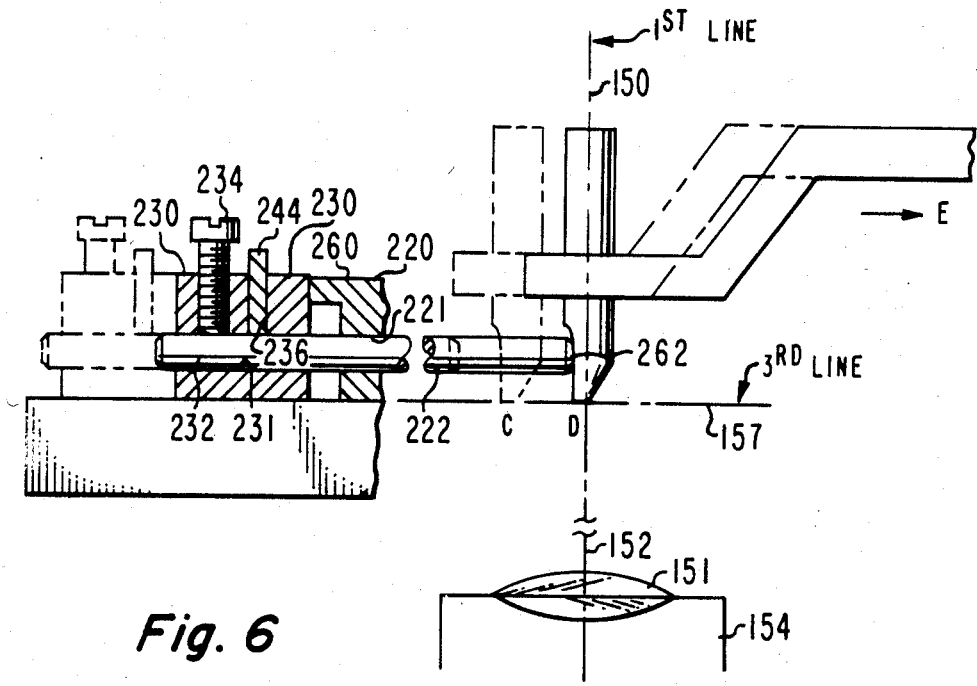
FIG. 6 is an enlarged view of the area encircled by phantom lines shown in FIG. 3.

A pin bearing block 220 having a bored through hole 221 is attached with suitable screw fasteners to the mounting surface 20 in the position shown in FIGS. 1,2, and 3. A push pin 222 is slidingly arranged within the hole 221. The axis of the push pin 222 is aligned vertically above and parallel to the third line 157 as can be seen in FIGS. 1 and 6. A relief or cutout 224 may be provided in the block 220 to reduce friction between the push pin 222 and the block 220. A collar 230 is mounted on the end of the push pin 222 and adjustably secured thereon by a set screw 234. The collar 230 has a slot 236 formed therein normal to the bored through hole 231.

A leaf spring 240 has one end attached to the pillow block 110 with two screws 242 and has the other end 244 snugly inserted into the slot 236 of the collar 230. The leaf spring 240, while being resilient in the horozontal direction, is arranged to be rigid in the vertical direction so that the end 244 is held captive within the slot 236.

In operation the U shaped actuating arm 100 is raised to a vertical position as shown in FIG. 1 and a stylus cartridge 12 is inserted between the two pairs of guide blocks 30 and 32 and firmly positioned on the surfaces 62 of the parallel bars 60. The leaf spring 52 pushing against the end of the cartridge 12 urges the surfaces 50 into pressing contact with the abutting walls 48 of the guide blocks 32. The arm 100 is then pivoted about the pintles 106 causing the spring depressing member 120 to enter the opening 130 in the cartridge 12 and depress the retaining spring 80 as shown in FIG. 2. This action moves the stylus holder 70 from its fully retracted position shown as dashed lines at B in FIG. 2 to its fully extended position shown as solid lines at A. As the stylus holder 70 undergoes a first movement and moves from position B to position A the stylus 14 engages the locating block 140. As is shown in FIG. 4, the stylus may engage either of the pair of guide surfaces 170 during its downward movement. Such engagement, by a camming action, will shift the stylus laterally toward the first line 150 and the center of the slit 142. Since the included angle 174 of the stylus point 160 is greater than the included angle 172 of the pair of guide surfaces 170, the point 160 of the stylus 14 cannot contact the guide surfaces 170 as the stylus moves into engagement with the locating block 140. As the point 160 of the stylus moves downwardly past the pair of edges 178, the lower corners 250 of the stylus holder 70 may contact the guide surfaces 170 thereby camming the stylus 14 and holder 70 laterally toward the first line 150. As the corners 250 pass the edges 178 the lateral movement of the stylus point 160 is limited by the clearance between the holder 70 and the pair of edges 178. This clearance is substantially smaller than the width of the slit 142, so that as the point 160 enters the slit 142, the point is prevented from touching the contact surfaces 144. As the stylus 14 continues moving downwardly, as viewed in FIG. 4, the bevelled surfaces 148 of the stylus 14 engage the contact surfaces 144 and automatically center the point 160 on the first line 150. This procedure, in addition, positions the point 160 on the second line 153 which lies within the focal plane 155 of the microscope.

As the U shaped actuating arm 100 is further pivoted, the spring depressing member 120 continues to depress the retaining spring 80 until the stop clamp 126 engages the top surface or web 252 of the cartridge 12 as shown in FIG. 3. This additional pivotal movement of the arm 100 from the position shown in FIG. 2 to the position shown in FIG. 3 effects no further vertical movement of the stylus 14 and holder 70. However, this additional pivotal movement does cause the roller 204 to engage the camming surface 212 thereby causing the slide member 206 and the pin 214 to move in the horizontal plane to the right as viewed in FIG. 5. The pin 214 engages the leaf spring 240, as shown in FIGS. 1 and 5, deflecting it to the right in the direction of the movement of the slide member 206. This movement causes the collar 230 and the push pin 222 to move to the right, as viewed in FIG. 6, until the collar 230 engages a projection 260 of the pin bearing block 220. During this movement, the end 262 of the push pin 222 engages the stylus 14, moving the stylus and the holder 70, in the direction indicated by arrow E in FIG. 6, from the position shown in dashed lines at C to the position shown in solid lines at D. This positions the stylus point 160 substantially on the point of intersection of the first, second, and third lines 150, 153, and 157 respectively, as shown in FIG. 7. The position of the collar 230 with respect to the push pin 222 may be adjusted to very accurately control the final position of the styulus point 160.

The U shaped actuating arm 100 may be selectively retained in this position by an off center spring or some other suitable mechanism, not shown, while the stylus point 160 is being inspected through the microscope 154. When removal of the cartridge 12 is desired, the actuating arm 100 is raised to its vertical position as shown in FIG. 1 causing the stylus holder 70 to undergo a second movement upwardly, thereby disengaging the stylus from the locating block 140. The cartridge is then simply lifted upwardly and out of engagement with the guide blocks 30, 32.

It shall be understood that the novel features of the present invention involve the automatic positioning of a stylus point within the field of view of a high power microscope in a two step process. The first step being positioning the point in two dimensions of a three dimensional frame of reference that locates the point at the focal plane and in a lateral direction and the second step being positioning the point in the third dimension which locates the point in a longitudinal direction with respect to the stylus cartridge. The important advantages achieved by employing the teachings of the present invention are the capability to consistently and automatically position the point of a very small stylus as described above and to prevent contact between the positioning apparatus and the fragile stylus point.

I claim:

1. Apparatus for positioning a point of a stylus within the field of view and at the focal point of an optical microscope wherein said stylus includes a pair of bevelled surface converging in a direction toward said point and is carried by a stylus holder, said apparatus comprising:
    (a) means for positioning said stylus holder with respect to said microscope, said means including a frame;
    (b) guide means for positioning said point of said stylus within the field of view and at the focal point of said microscope upon engagement with a portion of said stylus other than said point comprising:
        (1) locating block means for positioning said point of said stylus along a first line which is substantially parallel to the optical axis of said microscope and along a second line which is perpendicular to said first line and substantially coincident with the focal plane of said microscope comprising a first contact surface and a second contact surface each of which is arranged to contact a different one of said pair of bevelled surfaces of said stylus at points on opposite sides of said thire line; and
        (2) locating rod means for positioning said point of said stylus along a third line arranged orthogonal to said first and second lines wherein said second and third lines intersect within the field of view of said microscope;
    (c) actuating means for effecting said engagement of said portion of said stylus with said guide means comprising an actuating arm having a first end pivotally attached to said frame and a second end opposite said first end having a stylus actuating member attached thereto, said actuating arm arranged so that pivotal movement thereof in selected directions selectively causes said stylus to undergo first and second movements wherein said stylus engages said guide menas upon selection of said first movement and disengages said guide means upon selection of said second movement.

2. The apparatus set forth in claim 1 wherein said locating block means further comprises a pair of guide surfaces arranged on opposite sides of said third line, said guide surfaces being mutually inclined and converging approximately toward said third line and forming an included angle that is smaller than the included angle formed by said pair of bevelled surfaces of said stylus.

3. The apparatus set forth in claim 2 including a pair of mutually opposed edges wherein each one of said pair of guide surfaces terminates in a different one of said pair of edges, said edges being spaced apart a distance sufficient to permit passage of said stylus therebetween, said guide surfaces and said edges being further arranged so that said point of said stylus avoids contact with said guide surfaces, said edges, and said contact surfaces when said actuating means causes said body to undergo said first and second movements.

4. The apparatus set forth in claim 3 wherein said locating rod means comprises an abutting member effective for moving said stylus in a direction along said third line for a predetermined distance and a control means for rendering said abutting member effective only after said point of said stylus has been positioned along said first and second lines.

5. The apparatus set forth in claim 4 wherein said abutting member has a contact surface at one end thereof that is arranged to undergo a first movement in a direction parallel to said third line and pressingly contact said stylus thereby effecting said moving of said stylus.

6. The apparatus set forth in claim 9 wherein said locating rod means includes a pin bearing block rigidly attached to said frame and having a hole bored therethrough on an axis that is parallel to said third line, and wherein said abutting member is of cylindrical shape and arranged in sliding engagement with said bored hole of said pin bearing block.

7. The apparatus set forth in claim 6 wherein said locating rod means further includes:
 (a) a slide member arranged to undergo a second movement in a longitudinal direction parallel to said third line, said slide member having a cam surface associated therewith;
 (b) a coupling means for coupling said slide member to said abutting member so that when said slide member is caused to undergo said second movement said abutting member is caused to undergo said first movement thereby; and
 (c) a cam operating member attached to said actuating arm and arranged to engage said cam surface upon said pivotal movement of said actuating arm thereby imparting said second movement to said slide member.

8. The apparatus set forth in claim 7 wherein said control means comprises a collar interposed said coupling means and said abutting member, said collar being attached to said coupling means and adjustably secured to said abutting member.

* * * * *